United States Patent
Black

(10) Patent No.: US 10,402,645 B2
(45) Date of Patent: Sep. 3, 2019

(54) METHOD AND APPARATUS FOR RECOGNITION AND MATCHING OF OBJECTS DEPICTED IN IMAGES

(71) Applicant: Sony Computer Entertainment Inc., Tokyo (JP)

(72) Inventor: Glenn Black, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/565,204

(22) Filed: Dec. 9, 2014

(65) Prior Publication Data
US 2016/0092732 A1 Mar. 31, 2016

Related U.S. Application Data

(60) Provisional application No. 62/057,223, filed on Sep. 29, 2014, provisional application No. 62/057,219, filed on Sep. 29, 2014.

(51) Int. Cl.
*G06K 9/00* (2006.01)
*G06T 11/00* (2006.01)
(Continued)

(52) U.S. Cl.
CPC ..... *G06K 9/00624* (2013.01); *G06K 9/00214* (2013.01); *G06K 9/00671* (2013.01);
(Continued)

(58) Field of Classification Search
None
See application file for complete search history.

(56) References Cited

U.S. PATENT DOCUMENTS

| 7,073,129 B1 | 7/2006 | Robarts |
| 7,800,646 B2 | 9/2010 | Martin |

(Continued)

FOREIGN PATENT DOCUMENTS

| CN | 1160580 | 8/2004 |
| CN | 103635892 | 3/2014 |

(Continued)

OTHER PUBLICATIONS

"AroundMe", AroundMe, archive of Jun. 22, 2011 http://www.aroundmeapp.com/, pp. 1-2.

(Continued)

*Primary Examiner* — Matthew C Bella
*Assistant Examiner* — Brian Shin
(74) *Attorney, Agent, or Firm* — Fitch, Even, Tabin & Flannery LLP

(57) ABSTRACT

A method includes identifying one or more objects in one or more images of real-world scenes associated with a user, adding the identified one or more objects to a list of real-world objects associated with the user, assigning each object in the list of real-world objects to an object class based on object recognition, and providing a notification to the user that a content item has been associated with an object class assigned to one of the objects on the list of real-world objects associated with the user. A computer readable storage medium stores one or more computer programs, and an apparatus includes a processor-based device.

12 Claims, 7 Drawing Sheets

(51) Int. Cl.

| | |
|---|---|
| *G06T 19/00* | (2011.01) |
| *G06K 9/46* | (2006.01) |
| *G06K 9/62* | (2006.01) |
| *G06T 11/60* | (2006.01) |

(52) U.S. Cl.
CPC ............ *G06K 9/6201* (2013.01); *G06T 11/60* (2013.01); *G06T 19/006* (2013.01); *G06K 9/00664* (2013.01); *G06K 9/4604* (2013.01); *G06K 9/4619* (2013.01); *G06K 9/4647* (2013.01); *G06T 2219/004* (2013.01)

(56) References Cited

U.S. PATENT DOCUMENTS

| | | | |
|---|---|---|---|
| 7,853,296 | B2 | 12/2010 | Yu |
| 8,194,940 | B1 | 6/2012 | Kiyohara |
| 8,270,684 | B2 | 9/2012 | Kiyohara |
| 8,341,145 | B2 | 12/2012 | Dodson |
| 8,743,145 | B1 | 6/2014 | Price |
| 8,798,401 | B1 | 8/2014 | Johnson |
| 9,020,918 | B2 | 4/2015 | Ikenoue |
| 9,275,499 | B2 | 3/2016 | Adhikari |
| 9,280,849 | B2 | 3/2016 | Adhikari |
| 9,280,850 | B2 | 3/2016 | Adhikari |
| 9,280,851 | B2 | 3/2016 | Adhikari |
| 9,280,852 | B2 | 3/2016 | Adhikari |
| 9,286,721 | B2 | 3/2016 | Adhikari |
| 9,342,817 | B2 | 5/2016 | Elliott |
| 9,342,927 | B2 | 5/2016 | Adhikari |
| 10,216,996 | B2 | 2/2019 | Black |
| 2004/0212630 | A1 | 10/2004 | Hobgood |
| 2006/0038833 | A1 | 2/2006 | Mallinson |
| 2006/0232499 | A1 | 10/2006 | Ebersole |
| 2008/0052349 | A1 | 2/2008 | Lin |
| 2009/0054084 | A1 | 2/2009 | Buhrke |
| 2009/0248300 | A1 | 10/2009 | Dunko |
| 2010/0002941 | A1* | 1/2010 | Fonseca ............. G06K 9/00664 382/209 |
| 2010/0049585 | A1 | 2/2010 | McIntyre |
| 2010/0050090 | A1 | 2/2010 | Leebow |
| 2010/0179857 | A1 | 7/2010 | Kalaboukis |
| 2010/0191827 | A1 | 7/2010 | Martin |
| 2010/0211898 | A1 | 8/2010 | Bhojani |
| 2010/0232656 | A1 | 9/2010 | Ryu |
| 2010/0309225 | A1 | 12/2010 | Gray |
| 2010/0325218 | A1 | 12/2010 | Castro |
| 2011/0013810 | A1 | 1/2011 | Engstrom |
| 2011/0052012 | A1 | 3/2011 | Bambha |
| 2011/0064281 | A1 | 3/2011 | Chan |
| 2011/0164163 | A1 | 7/2011 | Bilbrey |
| 2011/0212717 | A1 | 9/2011 | Rhoads |
| 2011/0234631 | A1 | 9/2011 | Kim |
| 2011/0249144 | A1 | 10/2011 | Chang |
| 2012/0113142 | A1 | 5/2012 | Adhikari |
| 2012/0113143 | A1 | 5/2012 | Adhikari |
| 2012/0113144 | A1 | 5/2012 | Adhikari |
| 2012/0113145 | A1 | 5/2012 | Adhikari |
| 2012/0113274 | A1 | 5/2012 | Adhikari |
| 2012/0114297 | A1 | 5/2012 | Adhikari |
| 2012/0116920 | A1 | 5/2012 | Adhikari |
| 2012/0120101 | A1 | 5/2012 | Adhikari |
| 2012/0157044 | A1 | 6/2012 | Kim |
| 2012/0233032 | A1 | 9/2012 | Calman |
| 2012/0250950 | A1 | 10/2012 | Papakipos |
| 2013/0013683 | A1 | 1/2013 | Elliott |
| 2013/0066878 | A1 | 3/2013 | Flynn |
| 2013/0129142 | A1 | 5/2013 | Miranda-Steiner |
| 2013/0135348 | A1 | 5/2013 | Anzai |
| 2013/0222369 | A1 | 8/2013 | Huston |
| 2014/0044358 | A1 | 2/2014 | Srinivasan |
| 2014/0078174 | A1 | 3/2014 | Williams |
| 2014/0245335 | A1 | 8/2014 | Holden |
| 2014/0253743 | A1 | 9/2014 | Loxam |
| 2015/0012365 | A1 | 1/2015 | McIntyre |
| 2015/0013016 | A1* | 1/2015 | Kanter ............... G06F 21/6245 726/28 |
| 2016/0093106 | A1 | 3/2016 | Black |
| 2016/0261669 | A1 | 9/2016 | Elliott |

FOREIGN PATENT DOCUMENTS

| | | |
|---|---|---|
| CN | 103635892 B | 10/2017 |
| CN | 107491701 A | 12/2017 |
| JP | 2002175315 | 6/2002 |
| JP | 2010198604 | 9/2010 |
| JP | 2012500439 | 1/2012 |
| JP | 2012165276 | 8/2012 |
| JP | 2013105345 | 5/2013 |
| JP | 6349031 | 6/2018 |
| WO | 2013006584 | 1/2013 |

OTHER PUBLICATIONS

"Augmented Reality", Layar, archive of Sep. 4, 2013 https://www.layar.com/augmented-reality/, pp. 1-3.

"Layar revolutionizes Mobile Content Discovery with new Stream Technology powered browser" brochure, Layar, archive of Jun. 2, 2010 http://site.layar.com/company/blog/layar-revolutionizes-mobile-content-discovery/, pp. 1-6.

"The easiest way to add Augmented Reality in your app.", archive of Nov. 17, 2010 http://site.layar.com/company/blog/the-easiest-way-to-add-augmented-reality-in-your-app/, pp. 1-4.

"Tweakersoft", Tweakersoft, archive of Nov. 29, 2010 http://tweakersoft.com/, 1 page.

Belimpasakis, Petros., et al; "Enabling Rapid Creation of Content for Consumption in Mobile Augmented Reality", 2010 Fourth International Conference on Next Generation Mobile Applications, Services and Technologies (NGMAST 2010), Jul. 27-29, 2010, pp. 1-6.

Capin, Tolga, et al.; "The State of the Art in Mobile Graphics Research", IEEE Computer Graphics and Applications, vol. 28, No. 4, Jul./Aug. 2008, pp. 74-84.

Constanza, Enrico, Kunz, Andrea, & Fjeld, Morten; "Mixed Reality: A Survey", appearing in Human Machine Interaction.vol. LNCS 5440. Berlin: Springer, May 2009. 47-68.

Gammeter, Stephan, et al.; "Server-side object recognition and client-side object tracking for mobile augmented reality", Computer Vision and Pattern Recognition Workshops (CVPRW), 2010 IEEE Computer Society Conference on. IEEE Jun. 13-18, 2010; pp. 1-8.

Gotow, J. Benjamin, et al.; "Addressing Challenges with Augmented Reality Applications on Smartphones", Mobile Wireless Middleware, Operating Systems, and Applications, Lecture Notes of the Institute for Computer Sciences, Social Informatics and Telecommunications Engineering vol. 48, 2010, pp. 1-14.

Klein, Georg, et al.; "Parallel Tracking and Mapping on a Camera Phone", 8th (IEEE) and (ACM) International Symposium on Mixed and Augmented Reality, 2009, pp. 1-4.

Patent Cooperation Treaty; "International Search Report" issued in corresponding PCT Application No. PCT/US15/50870, dated Dec. 11, 2015; 2 pages.

Patent Cooperation Treaty; "International Search Report" issued in PCT/US15/50908, dated Dec. 18, 2015; 2 pages.

Patent Cooperation Treaty; "Notification of Transmittal of the International Search Report and the Written Opinion of the International Searching Authority, or the Declaration" issued in corresponding PCT Application No. PCT/US15/50870, dated Dec. 11, 2015; 1 page.

Patent Cooperation Treaty; "Notification of Transmittal of the International Search Report and the Written Opinion of the International Searching Authority, or the Declaration" issued in PCT/US15/50908, dated Dec. 18, 2015; 2 pages.

Patent Cooperation Treaty; "Written Opinion of the International Searching Authority" issued in corresponding PCT Application No. PCT/US15/50870, dated Dec. 11, 2015; 10 pages.

Patent Cooperation Treaty; "Written Opinion of the International Searching Authority" issued in PCT/US15/50908, dated Dec. 18, 2015; 8 pages.

(56) References Cited

OTHER PUBLICATIONS

Rosten, Edward, et al.; "Faster and better: a machine learning approach to corner detection", IEEE Trans. Pattern Analysis and Machine Intelligence, 2010, pp. 1-15.
Rosten, Edward, et al.; "Machine learning for high-speed corner detection", European Conference on Computer Vision, May 2006, pp. 1-14.
Takacs, Gabriel, et al.; "Outdoors Augmented Reality on Mobile Phone Using Loxel-Based Visual Feature Organization"; Proceedings of the 1st ACM International Conference on Multimedia Information Retrieval; ACM, 2008; pp. 427-434.
Van Krevelen, D.W.F. & Poelman, R.; "A Survey of Augmented Reality Technologies, Applications and Limitations"; The International Journal of Virtual Reality, vol. 9, No. 2. (Jun. 2010), pp. 1-19.
Chinese Patent Office; "First Office Action" issued in Chinese Patent Application No. 201280033005.3, dated Sep. 30, 2015, 42 pages (includes English translation).
Patent Cooperation Treaty; "International Search Report" issued in PCT/US12/45314, dated Sep. 24, 2012, 2 pages.
USPTO; Final Office Action & Examiner-Initiated Interview Summary issued in U.S. Appl. No. 13/220,536, dated May 23, 2014, 19 pages.
USPTO; Final Office Action issued in U.S. Appl. No. 13/220,536, dated Apr. 1, 2015, 19 pages.
USPTO; Final Office Action issued in U.S. Appl. No. 13/220,536, dated May 31, 2013, 25 pages.
USPTO; Notice of Allowance issued in U.S. Appl. No. 13/220,536, dated Jan. 7, 2016, 6 pages.
USPTO; Office Action & Examiner-Initiated Interview Summary issued in U.S. Appl. No. 13/220,536, dated Jul. 27, 2015, 20 pages.
USPTO; Office Action issued in U.S. Appl. No. 13/220,536, dated Dec. 23, 2014, 18 pages.
USPTO; Office Action issued in U.S. Appl. No. 13/220,536, dated Jan. 17, 2013, 22 pages.
USPTO; Office Action issued in U.S. Appl. No. 13/220,536, dated Jan. 24, 2014, 21 pages.
USPTO; Office Action issued in U.S. Appl. No. 13/220,536, dated Sep. 24, 2013, 26 pages.
Chinese Patent Office; "Second Office Action" issued in Chinese Patent Application No. 201280033005.3, dated Aug. 8, 2016, 6 pages (includes English translation).
Chinese Patent Office; "Third Office Action" issued in Chinese Patent Application No. 201280033005.3, dated Feb. 28, 2017, 5 pages (includes English translation).
USPTO; Final Office Action issued in U.S. Appl. No. 14/565,236, dated Jan. 27, 2017, 20 pages.
USPTO; Office Action issued in U.S. Appl. No. 14/565,236, dated Aug. 22, 2016, 16 pages.
USPTO; Office Action issued in U.S. Appl. No. 14/565,236, dated Jun. 9, 2017, 21 pages.
USPTO; Final Office Action issued in U.S. Appl. No. 14/565,236, dated Oct. 2, 2017, 24 pages.
Japanese Patent Office; "Notification of Reason(s) for Refusal" issued in Japanese Patent Application No. 2017-515779, dated Jan. 23, 2018, 8 pages. (includes English translation).
European Patent Office; "Invitation Pursuant to Rule 62a(1) EPC" issued in European Patent Application No. 15847522.8, dated Feb. 22, 2018, 2 pages.
European Patent Office; "Invitation Pursuant to Rule 62a(1) EPC" issued in European Patent Application No. 15845967.7, dated Feb. 16, 2018, 2 pages.
Japanese Patent Office; "Notification of Reason(s) for Refusal" issued in Japanese Patent Application No. 2017-515783, dated Mar. 6, 2018, 11 pages. (includes English translation).
USPTO; Notice of Allowance issued in U.S. Appl. No. 14/565,236, dated Mar. 15, 2018, 8 pages.
European Patent Office; "Extended European Search Report" issued in European Patent Application No. 15847522.8, dated Jun. 13, 2018, 9 pages.
Chinese Patent Office; "Notification of the Decision to Grant a Patent Right for Patent for Invention" issued in Chinese Patent Application No. 201280033005.3, dated Jun. 29, 2017, 5 pages. (includes English translation).
European Patent Office; "Extended European Search Report" issued in European Patent Application No. 15845967.7, dated Jun. 14, 2018, 10 pages.
Japanese Patent Office; "Decision to Grant a Patent" issued in Japanese Patent Application No. 2017-515779, dated May 8, 2018, 3 pages.
USPTO; Notice of Allowance issued in U.S. Appl. No. 14/565,236, dated Jul. 2, 2018, 7 pages.
Japanese Patent Office; "Decision to Grant a Patent" issued in Japanese Patent Application No. 2017-515783, dated Sep. 4, 2018, 3 pages.
USPTO; U.S. Appl. No. 61/411,053, filed Nov. 8, 2010.
Wikipedia; "AroundMe", archive from May 6, 2010 of http://en.wikipedia.org/w.index.php? title=AroundMe&oldid=360610438, pp. 1-2.
USPTO; Notice of Allowance and Fee(s) Due issued in U.S. Appl. No. 14/565,236, dated Oct. 12, 2018, 7 pages.
USPTO; Non-Final Office Action issued in U.S. Appl. No. 15/156,146, dated Oct. 2, 2018, 19 pages.
European Patent Office; "Communication Pursuant to Article 94(3) EPC" issued in European Patent Application No. 15845967.7, dated Feb. 27, 2019, 5 pages.
European Patent Office; "Communication Pursuant to Article 94(3) EPC" issued in European Patent Application No. 15847522.8, dated Feb. 27, 2019, 5 pages.
USPTO; Pending U.S. Appl. No. 16/360,016, filed Mar. 21, 2019.
USPTO; Pending U.S. Appl. No. 16/281,102, filed Feb. 21, 2019.
USPTO; Non-Final Office Action issued in U.S. Appl. No. 16/360,016, dated Apr. 15, 2019, 11 pages.

* cited by examiner

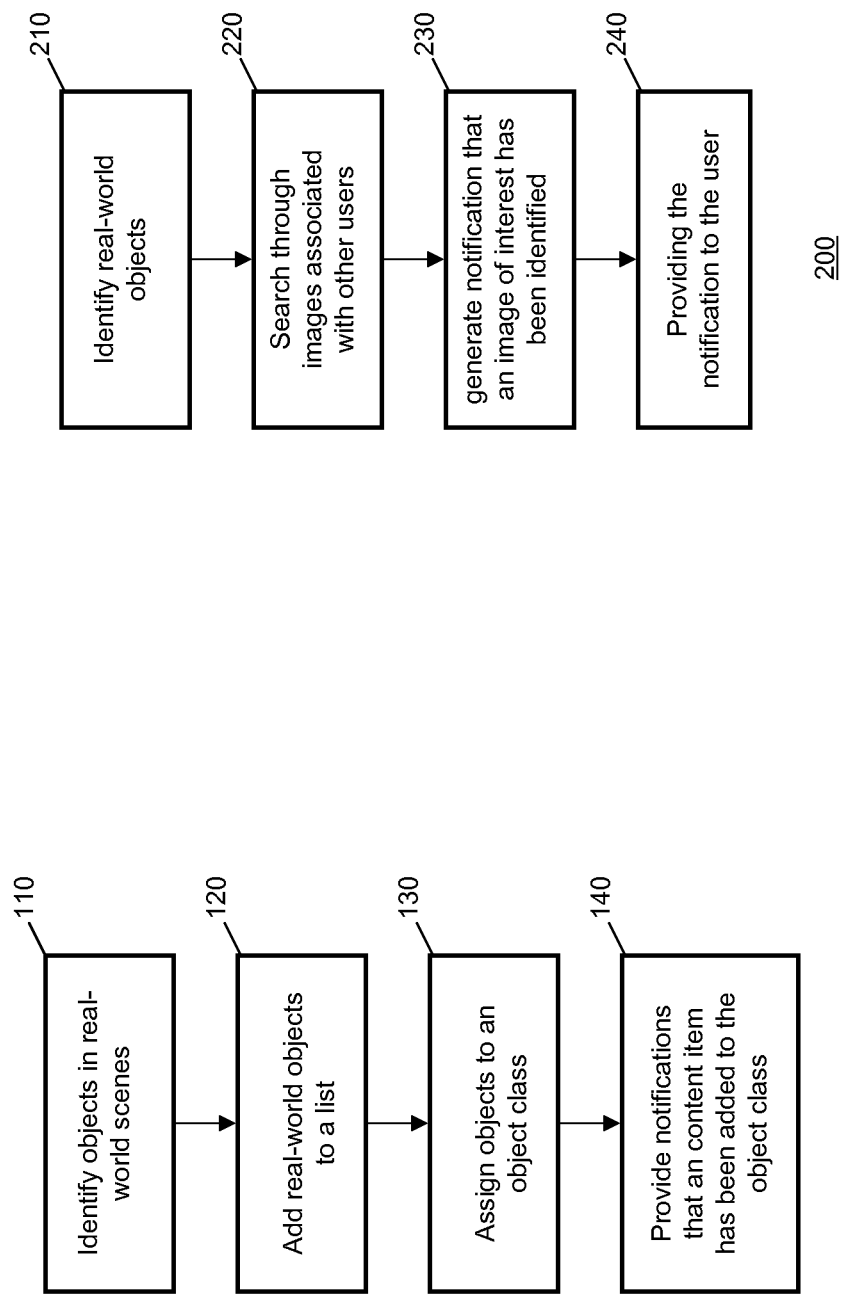

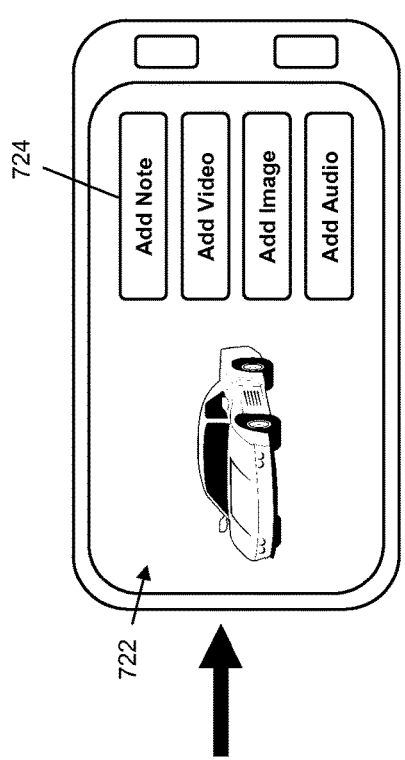
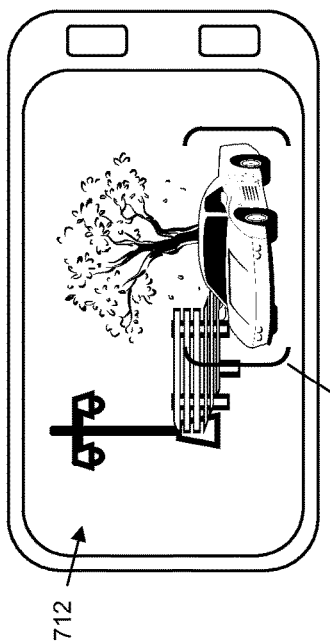
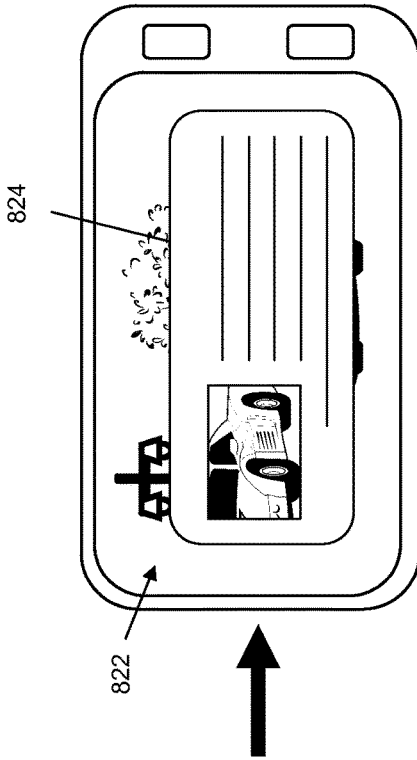
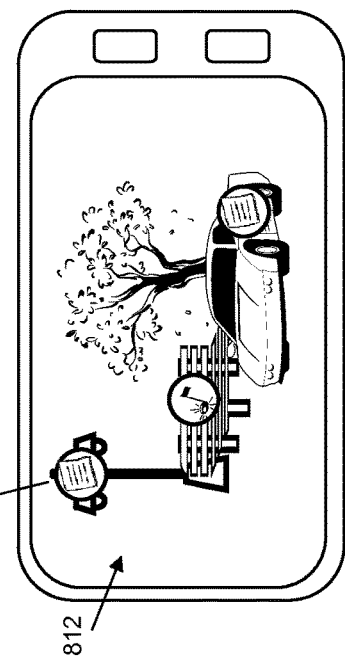
FIG. 7
FIG. 8

METHOD AND APPARATUS FOR RECOGNITION AND MATCHING OF OBJECTS DEPICTED IN IMAGES

CROSS-REFERENCE TO RELATED APPLICATIONS

This application claims the benefit of U.S. Provisional Patent Application No. 62/057,223, filed on Sep. 29, 2014, entitled "METHOD AND APPARATUS FOR RECOGNITION AND MATCHING OF OBJECTS DEPICTED IN IMAGES," the entire disclosure of which is hereby fully incorporated by reference herein in its entirety.

This application also claims the benefit of U.S. Provisional Patent Application No. 62/057,219, filed on Sep. 29, 2014, entitled "SCHEMES FOR RETRIEVING AND ASSOCIATING CONTENT ITEMS WITH REAL-WORLD OBJECTS USING AUGMENTED REALITY AND OBJECT RECOGNITION," the entire disclosure of which is hereby fully incorporated by reference herein in its entirety.

This application is related to U.S. patent application Ser. No. 14/565,236, filed on the same date as this application, entitled "SCHEMES FOR RETRIEVING AND ASSOCIATING CONTENT ITEMS WITH REAL-WORLD OBJECTS USING AUGMENTED REALITY AND OBJECT RECOGNITION," the entire disclosure of which is incorporated by reference herein in its entirety.

BACKGROUND OF THE INVENTION

1. Field of the Invention

The present invention relates generally to computer software applications, and more specifically to object recognition and matching apparatus and software.

2. Discussion of the Related Art

Sharing of user generated content has developed into one of the most popular uses on the Internet. The so called "Web 2.0" sites allow users to interact and collaborate with each other in a social media dialogue as creators of user-generated content in a virtual community, in contrast to Web sites where people are limited to the passive viewing of content.

SUMMARY OF THE INVENTION

One embodiment provides a method, comprising: identifying one or more objects in one or more images of real-world scenes associated with a user; adding the identified one or more objects to a list of real-world objects associated with the user; assigning each object in the list of real-world objects to an object class based on object recognition; and providing a notification to the user that a content item has been associated with an object class assigned to one of the objects on the list of real-world objects associated with the user.

Another embodiment provides an apparatus comprising: a processor-based device; and a non-transitory storage medium storing a set of computer readable instructions configured to cause the processor-based device to perform steps comprising: identifying one or more objects in one or more images of real-world scenes associated with a user; adding the identified one or more objects to a list of real-world objects associated with the user; assigning each object in the list of real-world objects to an object class based on object recognition; and providing a notification to the user that a content item has been associated with an object class assigned to one of the objects on the list of real-world objects associated with the user.

Another embodiment provides a method, comprising: identifying one or more objects in one or more images associated with a first user, wherein the identifying is performed by an object recognition technique run by a processor based apparatus; for each identified object, searching through one or more images associated with other users to identify one or more images of interest, wherein the one or more images of interest each depict an object that (i) has an appearance substantially matching the identified object and (ii) has been designated by one of the other users for inclusion in the searching; generating a notification that is based at least in part on any identified images of interest; and providing the notification to the first user.

Another embodiment provides a method, comprising: identifying one or more objects in one or more images of real-world scenes associated with a first user; adding the identified one or more objects to a list of real-world objects associated with the first user; assigning each object in the list of real-world objects to an object class based on object recognition; receiving a content item from the first user for a real-world object in the list of real-world objects; and storing the content item and an object class of the real-world object on a server such that the content item is retrievable by a second user viewing an object in the object class of the real-world object.

Another embodiment provides an apparatus comprising: processor-based device; and a non-transitory storage medium storing a set of computer readable instructions configured to cause the processor-based device to perform steps comprising: identifying one or more objects in one or more images of real-world scenes associated with a first user; adding the identified one or more objects to a list of real-world objects associated with the first user; assigning each object in the list of real-world objects to an object class based on object recognition; receiving a content item from the first user for a real-world object in the list of real-world objects; and storing the content item and an object class of the real-world object on a server such that the content item is retrievable by a second user viewing an object in the object class of the real-world object.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIGS. 1, 2, and 3 are flow diagrams illustrating methods of object recognition and matching in accordance with some embodiments of the present invention;

FIGS. 5, 6, 7, and 8 are diagrams illustrating user interfaces for object based content sharing in accordance with some embodiments of the present invention;

DETAILED DESCRIPTION

Figure 3:
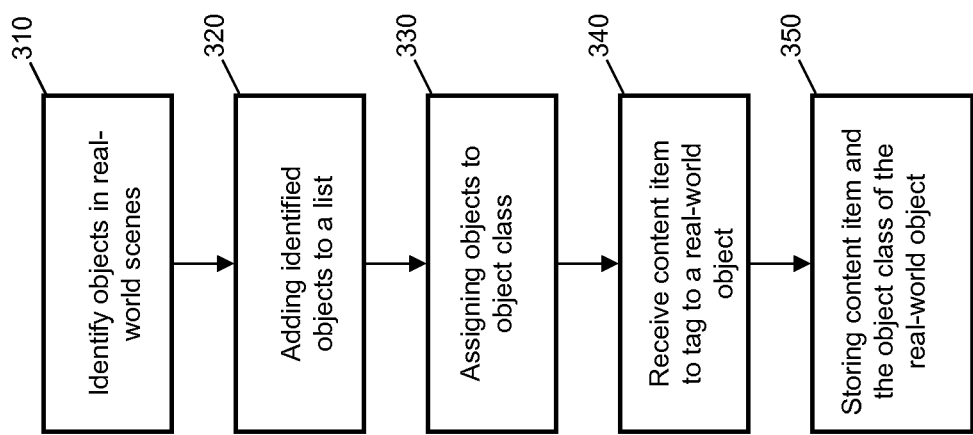

Some embodiments of the present invention provide methods and apparatuses for what may be described in some embodiments as object based content sharing. Object based content sharing provides a novel way of sharing stories, memories, and recorded media based on real-world objects. Using images associated with a user, in some embodiments the system is able to automatically identify various objects in the user's surrounding. The system then provides user interfaces for users to post and view contents based on these identified objects.

With object based content sharing, users may interact with each other based on real-world objects they own and/or encounter. For example, users with a rare comic book living miles apart may be connected to each other when the system identifies the same comic book in images associated with the user. The users can then share user-generated content and discuss their shared interest through the object based content service.

In some embodiments, the system may further provide flexibility in configuring how objects are matched and grouped for sharing to give users control over their privacy and their social networking experience. In some embodiments, the object based content sharing system allows users to be connected with other users who share their common interest, hobby, style, taste, lifestyle, etc. based on objects they own and/or encounter.

Referring to FIG. 1, there is illustrated an example of a method 100 for providing notification of content item associated with an object in accordance with some embodiments of the present invention. In some embodiments, steps of method 100 may be performed by one or more server devices, a user device, or a combination of server and user devices.

In step 110, the system identifies objects in images of real-world scenes associated with a user. The images of real-world scenes may include one or more of photos or videos in an online photo album associated with the user's online profile, a local storage on a user device, a cloud storage space associated with the user, and a collection of images that the user has been "tagged" in on a social media service, etc. The images may be captured at a plurality of locations and over a plurality of time periods such as over hours, days, months, or years. In some embodiments, objects may also be identified in images viewed by a camera when the camera is panning, without the image being permanently stored on the device. The objects may be objects in the background of photos of the user and/or other people. The system may run an image or object recognition algorithm on the images associated with a user and identify one or more objects in the images. In some embodiments, the system may only identify inanimate objects in the images associated with the user.

Generally, the system may utilize variously known computer object recognition techniques to recognize objects in the image of the real-world scene. In some embodiments, object recognition may use appearance-based methods which compare an image with reference images of known objects to recognize an object. Examples of appearance-based methods include edge matching, grayscale matching, histograms of receptive field responses, etc. In some embodiments, object recognition may use feature-based methods that rely on matching object features and image features. Examples of feature-based methods include pose clustering, geometric hashing, scale invariant feature transform, interpretation trees, etc. The system may use one or more object recognition methods in combination to enhance the accuracy of object identification.

In step 120, real-world objects identified in step 110 are added to a list of objects associated with the user. The object list may be maintained on a content sharing server and be associated with the user's user profile. In some embodiments, images of the objects are stored on the list in step 120. In some embodiments, identified attributes of the objects are stored to the list in step 120. For example, if the object is identified to be a PlayStation® 3 Slim, the description "PlayStation® 3 Slim" and attributes such as "game console" and "red" may be added to the list. In some embodiments, the list stores one or more images and attributes of the object. In some embodiments, before adding an object to the list, the system first checks for redundancy. For example, the system may first check to see if an object matching the object in the image is already on the list. In some embodiments, the system provides a user interface for the user to access and edit the list of objects. For example, a user may use the user interface to add and remove objects from the list of objects associated with him/her. In some embodiments, the user may also edit and/or correct attributes associated with the object. For example, a user may be able to select a PlayStation® 3 Slim on the list and enter in the model number and/or serial number. In another example, the system may isolate an object in an image without being able to match it with known objects. The user may manually enter attribute information for the object.

In step 130, one of more objects on the object list is assigned to an object class. An object class may refer to a unique object, a group of visually similar objects, or a group of objects sharing one or more common attributes. In some embodiments, an image of an object is assigned to an object class based on comparing the image to other images of objects already assigned to that object class. In some embodiments, the assigning in step 130 is based on one or more attributes of the object identified through object recognition. Real-world objects may be assigned to an object class based on running an image recognition algorithm on one or more images of the object in the real-world scenes. In some embodiments, features and/or attributes of the identified real-world objects are compared and matched to attributes associated with object classes and/or reference images of known objects. Features and attributes may include visual characteristics such as color, shape, contour, etc. In some embodiments, features and attributes may include attributes determined through image recognition. For example, the system may compare the image to a database of known objects to determine additional information about the image such as image type, name, and other attributes.

For example, an object may be identified to be a red PlayStation® 3 super slim console based on its color, shape, logo image, etc. The system may then assign the red PlayStation® 3 super slim console to one or more object classes such as: PlayStation® consoles, PlayStation® 3 consoles, PlayStation® 3 super slim consoles, and red PlayStation® 3 super slim consoles, etc. The object class assignments may be based on matching the attributes of the real-world object and the attributes associated with each of these object classes. In some embodiments, an object may be assigned to two or more object classes based on its attributes. In some embodiments, object classes may have a hierarchical relationship to one another and presented in that relationship for user configuration. In some embodiments, the user may be allowed to edit the object classes assigned to each object on his/her list of objects. For example, if a user does not wish to receive notification for all content items tagged to the "PlayStation® 3 consoles" object class, he/she may un-assign his/her console from the "PlayStation® 3 consoles" object class and only assign his/her console to the object class of "red PlayStation® 3 super slim consoles." In some embodiments, a list of suggested object classes may be determined using object recognition and provided to the user for user selection. In some embodiments, the user may manually search for object classes on the system to associate to an object on his/her list of objects.

In step 140, the system provides a notification that a content item has been added to an object class assigned to an object on the user's object list. For example, if a second user tags a photo to his PlayStation® which is also assigned to the "red PlayStation® 3 super slim consoles" object class, the system may provide a notification to users with a red PlayStation® 3 super slim consoles on his/her object list. The notification may be one or more of a pop-up notification, a sound notification, a vibration, a notification text or icon in an object based content sharing user interface, a notification message in a social media service, a text message, and/or an email message, etc. For example, once a new content item has been added, the system may cause the user's device to make a sound or vibrate. In another example, when a user opens an object based content sharing user interface or a social networking service, the system may cause an icon or a message to be displayed to the user to indicate that a new content item is available for viewing. In some embodiments, the user may configure what type of notification to receive. In some embodiments, the user may individually configure the type of notification to receive for each object and/or object class associated with the user. In some embodiments, the user may individually configure whether to receive notification for each object and/or object class associated with the user.

In some embodiments, prior to step 140, the system first determines whether the content item should be shared with the first user based on the content item's sharing setting and/or the first user's preference setting. In some embodiments, the author of the content item may restrict sharing of that content item. For example, the author may only allow users connected to him and/or following him in a social networking service to view the content. In some embodiments, the author may restrict who can view the content item based on age, geographical locations, time, etc. For example, the author may wish for the tagged content to only be made available years in the future, or only available for viewing within a time period. In some embodiments, the first user may also turn off notification based on the author of the content item. For example, the first user may wish to receive notification for content items only from his friends, people he is following, people in his social groups, etc. In another example, the user may be able to selectively block content item from selected authors. In these cases, the system may only proceed to step 140 if it determines that the content item should be shared with the first user.

Referring to FIG. 2, there is illustrated an example of a method 200 for providing notification of an image of interest in accordance with some embodiments of the present invention. In some embodiments, steps of method 200 may be performed by one or more server devices, a user device, or a combination of server and user devices.

In step 210, real-world objects are identified in images of real-world scenes associated with a user. The images of real-world scenes may include one or more of photos or videos in an online photo album associated with the user's online profile, a local storage on a user device, a cloud storage space associated with the user, and a collection of images that the user has been "tagged" in on a social media service, etc. The images may be captured at a plurality of locations and over a plurality of time periods, such as over hours, days, months, or years. In some embodiments, objects may also be identified in images viewed by a camera when the camera is panning, without the image being permanently stored on the device. The objects may be objects in the background of photos of the user and/or other people. The system may run an image or object recognition algorithm on the images associated with a user and identify one or more objects in the images. In some embodiments, the system may only identify inanimate objects in the images associated with the user.

In step 220, for each image identified in step 210, the system searches through one or more images associated with other users to identify one or more images of interest. The images of interest may depict an object that has an appearance substantially matching the identified object and has been designated by one of the other users for inclusion in the search.

In some embodiments, to match objects that have substantially matching appearances, image(s) of an identified real-world object is compared to images of objects associated with other users. In some embodiments, features and/or attribute of the identified real-world object are compared and matched to features and/or attribute of objects associated with other users. Features and attributes may include visual characteristics such as color, shape, contour, etc. In some embodiments, features and attributes may include attributes determined through object recognition. For example, the system may compare the image and/or visual attributes of the real-world object to a database of known objects to determine additional information about the image such as image type, name, and other attributes.

The system may further determine whether each image of interest has been designated by one of the other users for including in the searching based on sharing setting of each images of interest. In some embodiments, the sharing setting of the image of interest may be configured by the user associated with the image of interest. The sharing setting may restrict who can see the content item associated with the image of interest. For example, a user may restrict sharing of the content based on whether the users are connected through a social networking service. The image of interest may only be included in the search of a user's friends, followers, group members, etc. In some embodiments, the user may also restrict sharing based on the age, location, etc. of the user associated with the identified object. In some embodiments, the user may restrict a time period when the image of interest is searchable. For example, a user may configure for the image of interest to be searchable only for two days.

In step 230, a notification is generated when an image of interest is found in step 220. For example, if an image of a baseball cap has an appearance substantially matching the appearance of a baseball cap identified in step 210, and has been designated by the other user for inclusion in the searching, a notification is generated in step 230. The notification may be one or more of a pop-up notification, a sound notification, a vibration, a notification text or icon in an object based content sharing user interface, a notification message in a social media service, a text message, and/or an email message etc. In some embodiments, the notification may include a list of identified images of interest. In some embodiments, whether and how the notification is provided in step 230 is further based on the first user's configured preference.

In step 240, the notification generated in step 230 is provided to the user. In some embodiments, once an image of interest is found, the system may cause the user's device to make a sound or vibrate. In some embodiments, when a user opens an object based content sharing user interface or a social networking service, the system displays an icon or a message to the user to indicate that one or more matching images of interest have been found. In some embodiments, the user may configure what type of notification to receive.

In some embodiments, the system may further determine whether a content item has been associated with the object that has an appearance substantially matching the identified object. The user may associate a content item to an object through the object based content sharing system. Users with objects that match substantially may share their memories and experiences with each other by associating content items such as a text comment, an image, an audio clip, a video clip, and a hyperlink to the object. The notification in step 240 may further include an indication of any content item that has been associated with or tagged to any objects having an appearance substantially matching any identified objects.

Referring to FIG. 3, there is illustrated an example of a method 300 for associating a content item to a real-world object in accordance with some embodiments of the present invention. In some embodiments, the steps of method 300 may be performed by one or more server devices, a user device, or a combination of server and user devices.

In step 310, the system identifies objects in real-world scenes associated with a user. The images of real-world scenes may include one or more of photos or videos in an online photo album associated with the user's online profile, a local storage on a user device, a cloud storage space associated with the user, and a collection of images that the user has been "tagged" in on a social media service, etc. The images may be captured at a plurality of locations and over a plurality of time periods, such as over hours, days, months, or years. In some embodiments, objects may also be identified in images viewed by a camera when the camera is panning, without the image being permanently stored on the device. The objects may be objects in the background of photos of the user and/or other people. The system may run an image or object recognition algorithm on the images associated with a user and identify one or more objects in the images. In some embodiments, the system may only identify inanimate objects in the images associated with the user.

In step 320, real-world objects identified in step 110 are added to a list of objects associated with the user. The object list may be maintained on a content sharing server and associated with the user's user profile. In some embodiments, images of the objects are stored to the list in step 320. In some embodiments, identified attributes of the objects are stored to the list in step 320. For example, if the object is identified to be a PlayStation® 3 Slim, the description "PlayStation® 3 Slim" and attributes such as "game console" and "red" may be added to the list. In some embodiments, the list stores one or more images and attributes of the object. In some embodiments, before adding an object to the list, the system first checks for redundancy. For example, the system may first check to see if an object matching the object in the image is already on the list. In some embodiments, the system provides a user interface for the user to access and edit the list of objects. For example, a user may use the user interface to add and remove objects from the list of objects associated with him/her. In some embodiments, the user may also edit and/or correct attributes associated with the object. For example, a user may be able to select a PlayStation® 3 Slim on the list and enter in the model number and/or serial number. In another example, the system may isolate an object in an image without being able to match it with known objects. The user may manually enter attribute information for the object.

In step 330, one of more objects on the object list is assigned to an object class. An object class may refer to a unique object, a group of visually similar objects, or a group of objects sharing one or more common attributes. Real-world objects may be assigned to an object class based on running an image recognition algorithm on one or more images of the object in the real-world scenes. In some embodiments, features and/or attribute of the identified real-world object are compared and matched to attributes associated with each object class. For example, an object class assigned to an object identified to be a red PlayStation® 3 super slim console may be all PlayStation®s, PlayStation® 3's, PlayStation® 3 super slims, and red PlayStation® 3 super slim consoles etc. Features and attributes may include visual characteristics such as color, shape, contour, etc. In some embodiments, features and attributes may include attributes determined through image recognition. For example, the system may compare the image to a database of known objects to determine additional information about the image such as image type, name, and other attributes. In some embodiments, if the object identified in step 310 does not match any of the existing object classes, the user may have the option to create a new object class by defining the common attributes for the object class.

In some embodiments, the assigning in step 330 is based on one or more attributes of the object identified through object recognition. In some embodiments, an object may be assigned to two or more object classes based on its attributes. In some embodiments, the user may be allowed to edit the object classes assigned to each object on his/her list of objects. For example, if a user does not wish to share content items with owners of all PlayStation® 3 consoles, he/she may un-assign his/her console from the PlayStation® 3 object class. In some embodiments, a list of suggests object classes may be determined using object recognition and provided to the user for user selection. In some embodiments, the user may manually search for object classes on the system to associate to an object on his/her list of objects. Generally, in some embodiments, steps 310, 320, and 330 may be similar to steps 110, 120, and 130 respectively. In some embodiments, steps 310, 320, and 330 are the same as steps 110, 120, and 130.

In step 340, a content item to tag to a real-world object is received. The content item may be one or more of a video, audio, image, and text comment. In some embodiments, the user interface may include options to capture one or more of a video clip, an audio clip, and an image to tag to the object. In some embodiments, the user can further configure a sharing setting for the content item in step 340. For example, the user may restrict the sharing of the content item such that it is only viewable by other users who are connected through a social networking service. In some embodiments, the sharing setting of the content item may further restrict sharing based on age and/or geographical location. The geographical location restriction may be used by the user to distinguish two visually similar items from one another. For example, a user may restrict the sharing of a content item tagged to a park bench using the GPS location of the park bench, such that the content item would only be matched to the exact park bench in other user's photos. The location restriction may be based on the current location of a user device and/or the location metadata information of the image of the real-world scene containing the object. In some embodiments, the location information may be one of the attributes defined for an object class instead of being part of the sharing setting. For example, a bench at location A and a nearly identical looking bench at location B may be in two separate object classes. In some embodiments, the user may be able to select one or more object classes to associate with the content item.

In step 350, the content item and the associated object class of the real-world object is stored such that the content item is retrievable by another user who has an object on his objects list assigned to the same object class. For example, the content item may be stored with the attributes of the real-word object and/or the assigned object class. When another user has an object on their object list that share the select common attributes, the content item may be provided to the other user for viewing. In some embodiments, the availability of the content item may further be based on the sharing setting associated with the content item such as social network connection and locations restrictions.

Figure 4:
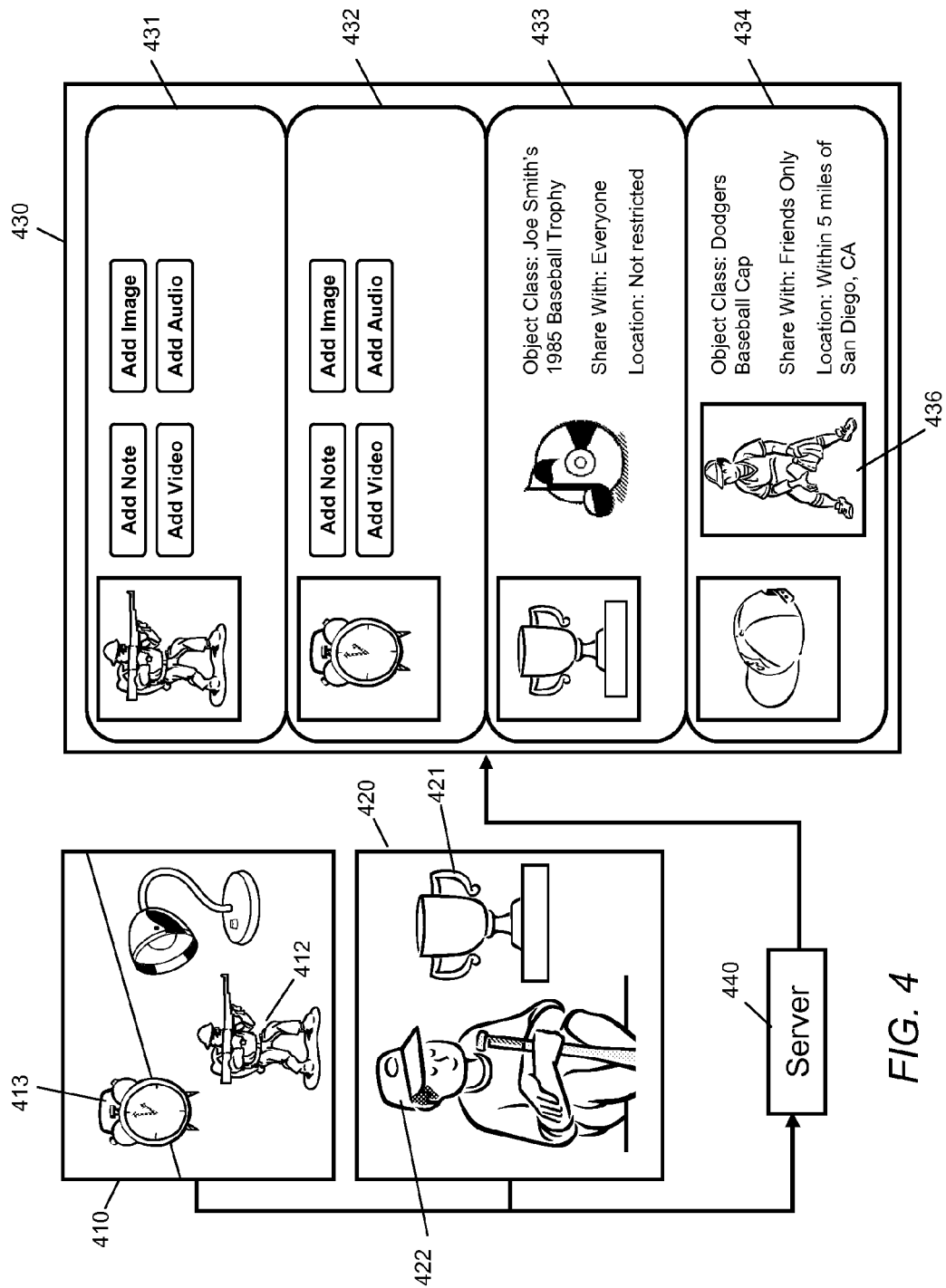
FIG. 4 is a diagram illustrating identifying objects in images of real-world scenes in accordance with some embodiments of the present invention.

Referring to FIG. 4, there is an example diagram illustrating the building of an object list associated with a user in accordance with some embodiments of the present invention. In FIG. 4, images of real-world scenes 410 and 420 associated with a user are processed by a server 440 to generate a list of objects associated with the user as shown in user interface 430. The images of real-world scenes 410 and 420 may include photos or videos in a online photo album, images stored on a user device, images in an album on a cloud storage, and images that the user is "tagged" in on a social media service, etc. The images may be a collection of images captured over periods of hours, days, months, or years, and captured at different locations. In some embodiments, objects may also be identified in images viewed by a camera when the camera is panning, without the image being permanently stored on the device. The system may run an object recognition algorithm on the images associated with a user and identify one or more objects in the images. In some embodiments, the system only identifies inanimate objects in the images associated with the user.

As shown in FIG. 4, the system identifies a toy soldier 412 and an alarm clock 413 in the first image of a real-world scene 410, and identifies a trophy 421 and a baseball cap 422 in the second image of a real-world scene 420. Each of the identified objects is then added to the list of objects associated with the user shown in the objects list user interface 430. The user may use the objects list user interface 430 to associate a content item to the identified object. The user may further configure the object class and the sharing settings of the objects through the objects list user interface 430.

In FIG. 4, the user has added an audio clip to the listing of the trophy 433, and configured the object class to be "Joe Smith's 1985 Baseball Trophy." The sharing setting for the listing of the trophy 433 has been set to "everyone" with no location restrictions. With this setting, anyone who has an image of Joe Smith's 1985 Baseball Trophy in an image associated with them may listen to the audio clip tagged to the trophy. For example, someone who comes across this trophy years in the future will be able to listen to an audio clip left by the user relaying his/her memory of about the trophy.

Also in FIG. 4, the user has tagged an image to the listing for the baseball cap 434. The object class has for the baseball cap 434 is "Dodgers Baseball Cap" and the sharing settings are set to "Friends Only" and "within 5 miles of San Diego, Calif." With this setting, friends of the user on the social network who has an image of a Dodger Baseball Cap within 5 miles of San Diego, Calif. may be able to view the image of the user wearing the baseball cap 436.

The user has not associated any content item with the listing for the toy soldier 431 and the listing for the alarm clock 432. The user may select one of the "add note," "add image," "add video," and "add audio" buttons to associate new content to the object.

While the sharing and location settings are shown to be settings associated with the identified object, in some embodiments, one or more of the sharing and location settings may be associated with the content item instead. Users may associate multiple content items to one object. Different content items associated with the same object on the objects list may have different object classes, sharing settings, and/or location settings.

Figure 5:
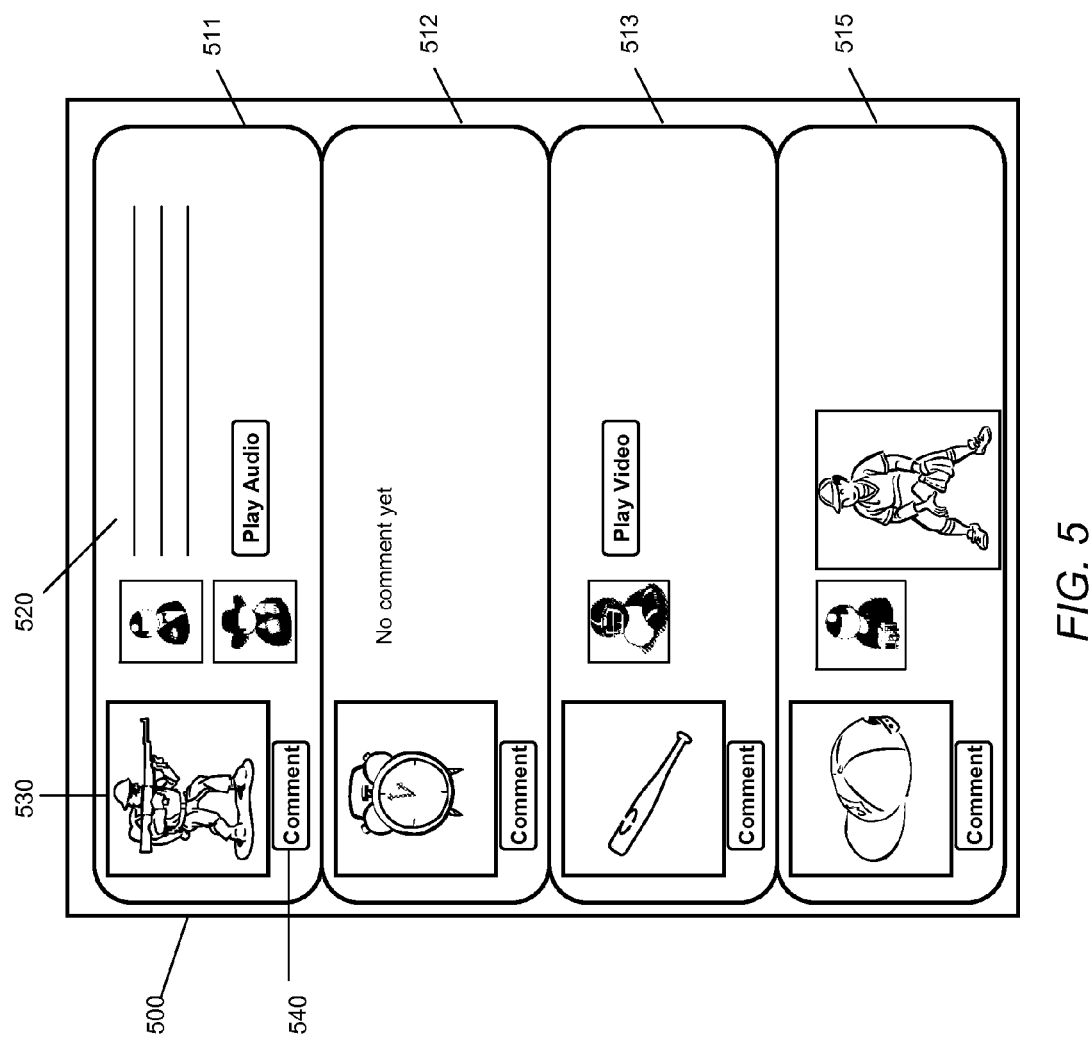

Referring to FIG. 5, there is illustrated an example of a user interface 500 for viewing content items associated with real-world objects in a list of objects in accordance with some embodiments of the present invention. When a user logs into the object based content sharing system, the user may have the option to view the list of objects associated with him/her and view any content item tagged to or associated with the objects by other users. In some embodiments, each object listing 511, 512, 513, and 515 includes an image of the object 530, any content items tagged to the object 520, and a comment option 540 for adding additional content item to the object.

The image of the object 530 may be an image extracted from an image of a real-world scene associated with the user and/or an image of the object representative of the object's assigned object class. The associated content items 520 may include one or more of a profile images associated with the user who added the content item, the content item, a preview of the content item, and an option to play the content item. The comment option 540 allows the user to generate and/or attach a new content item and to configure sharing settings similar to what is shown in FIG. 4.

In some embodiments, the user interface 430 and the user interface 500 may be merged such that the user can both view and add content items on the object list in the same user interface. In some embodiments, the object listings 511, 512, 513, and 515 may be sorted in the order of the newest content item tagged to each object and/or in the order of the newest object associated with the user.

Figure 6:
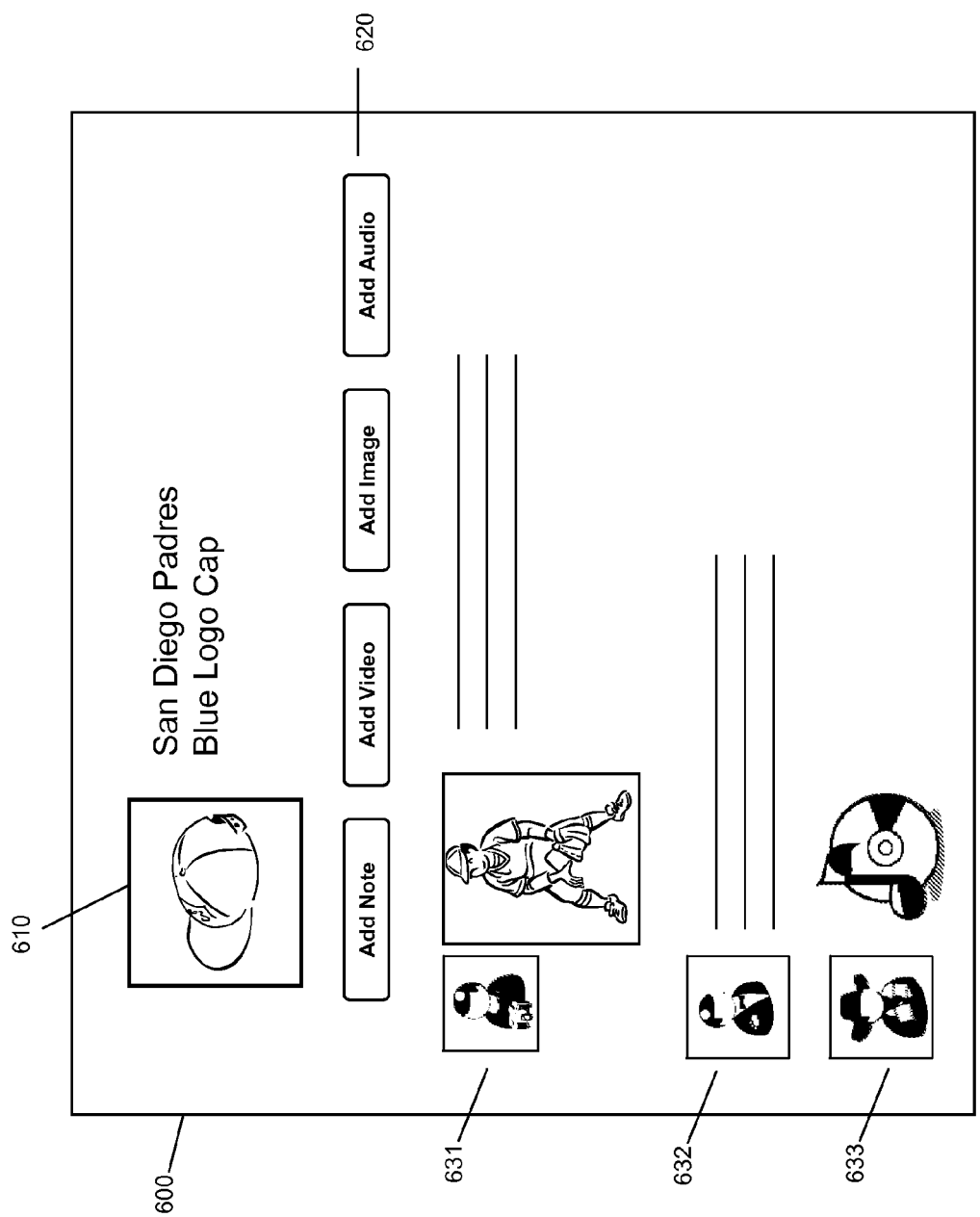

Referring to FIG. 6, there is illustrated another example of a user interface 600 for object based content sharing. The user interface 600 illustrates a content sharing page for an object or object class. The page may include one or more images 610 of the associated object(s), options for adding content 620, and content items 631, 632, and 633 tagged to the object or object class.

In FIG. 6, the page for "San Diego Padres Blue Logo Cap" is shown. Each of the content items 631, 632, and 633 may include one or more of a profile images associated with the user who added the content item, the content item, a preview of the content item, and an option to play the content item. In some embodiments, the user interface 600 may only be viewable by users with an object on their object list that matches the cap shown in image 610 and/or the common attributes associated with the "San Diego Padres Blue Logo Cap" object class. For example, if a user has taken a picture wearing a Padres blue logo cap, the system may recognize the cap as belonging to this object class, and connect the user to the object class shown.

In some embodiments, the content of the object page is only viewable to users with a matching object on their objects list. In some embodiments, the user interface 600 may be viewable by everyone but only users with an object on their list that matches the object class can add content items to the page. In some embodiments, an administrator of the object page may have the options to configure who can view and/or add content items to the object page. In some embodiments, users will only see content items with sharing setting that permits the user to see the content item. In some embodiments, the user interface is an alternative view to interfaces 430 and 500. In some embodiments, the object page may be accessed by selecting one of the object listings in FIGS. 5 and 6 and/or an object in an image of a real-world scene as described below with reference to FIGS. 7 and 8.

Referring to FIGS. 7 and 8, there are illustrated additional examples of user interfaces of an object based content sharing system in accordance with some embodiments of the present invention. In the user interface 710, the user may select an identified object 714 in a real world scene 712 to tag a content item to the object. The real world scene 712 may be a scene currently viewed by a device or an image that had been previously captured by the device or another device. The user may be viewing photos or videos stored on a user device or stored remotely, and select one of the objects, such as the car 714, in the image of the real-world scene to tag.

After the car 714 is selected, a tagging user interface 720 may be provided to the user for the user to enter or attached a content item to the object. The tagging user interface 720 may include an image of the selected object 722 and one or more options 724 for attaching the content item. Options may include "add note," "add video," "add image," and "add audio." In some embodiments, the tagging user interface 720 may further include options for configuring and assigning object class and sharing settings for the content item as described with reference to FIG. 4 above.

The user interface 810 shows displaying notifications of content items tagged to objects in an image of a real-world scene 812. The real world scene 812 may be a scene currently viewed by a device or an image that had been previously captured by the device or another device. For example, a user may go through an album of photos or videos and the notification may be provided if the image currently being viewed contains one or more tagged objects. Graphic indicators such as icon 814 may be displayed with image of the real-world scene 812 to indicate to the user that objects in the image have been tagged with content items that are available to the user.

When graphic indicators such as icon 814 are selected in the image of the real-world scene, the associated content item 824 may be displayed in the content item viewing interface 820. In some embodiments, the content item may be an overlay to the image of the real-world scene 822 as shown, or be displayed in full screen.

While the user interfaces in FIG. 8 are shown to be displayed by mobile devices, the user interfaces may be displayed on any type of user device having a display and may be part of an application ("app") and/or a website.

Figure 9:
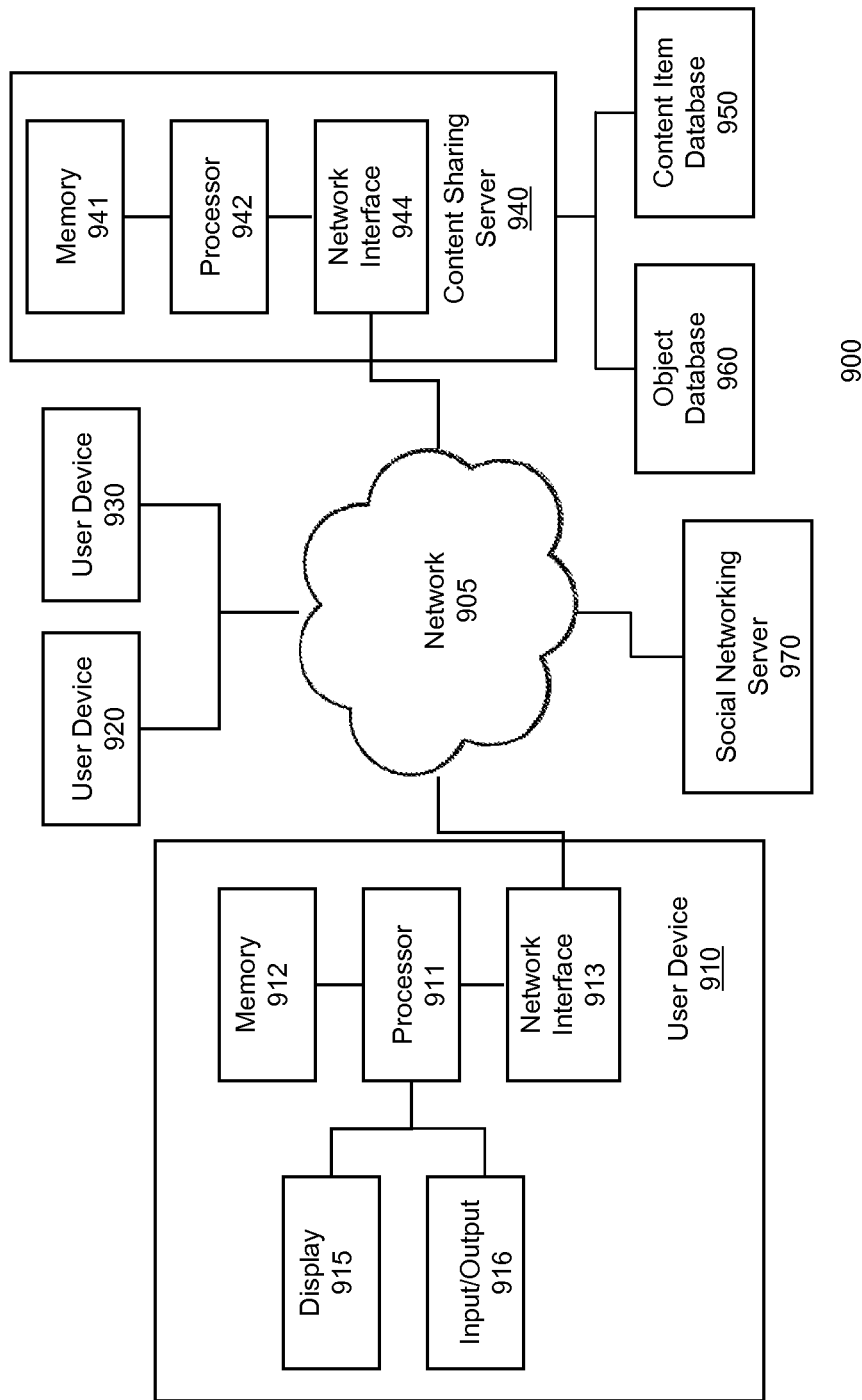
FIG. 9 is a block diagram illustrating a system that may be used to run, implement and/or execute any of the methods

FIG. 9 is a block diagram illustrating a system that may be used to run, implement and/or execute any of the methods and techniques shown and described herein in accordance with the embodiments of the present invention. The object based content sharing system 900 includes user devices 910, 920, and 930, an content sharing server 940, and social networking server 970 communicating over a network 905.

The user device 910 may be any user devices such as a desktop computer, a laptop computer, a Smartphone, a tablet computer, a pad-like device, a head-mounted display, and/or a wearable device. The user device 910 may include a processor 911, a memory 912, a network interface 913, a display 915, one or more other input/output devices 916. The processor 911 is configured to execute computer readable instructions stored in the memory 912 to facilitate one of more steps of the methods described with reference to FIGS. 1-3. The memory 912 may include RAM and/or a hard drive memory device. The network interface 913 is configured to transmit and receive data to and from at least the content sharing server 940 through the network 905. The display 915 may be a liquid crystal display (LCD), a light-emitting diode (LED) display, an organic light emitting diode (OLED) display, a liquid crystal on silicon (LCoS) display, a LED illuminated display, and the like. In some embodiments, the display 915 is a touch display that is configured to receive input from the user. In some embodiments, the display 915 is a head-mounted display that projects images to a lens or into the wear's eyes. The display may be used to display variously user interfaces described with reference to FIGS. 4-8 above. The user device 910 may further include other input/output devices 916 such as a microphone, a speaker, a tilt sensor, a compass, a USB port, a camera, a graphic processor, etc. The input/output devices 916 may be used to enter and/or playback content items.

User devices 920 and 930 may be user devices operated by one or more other users to access the object based content sharing system 900. It is understood that while three user devices are shown in FIG. 9, the system 900 may be accessed by any number of user devices and users.

The content sharing server 940 includes a processor 942, a memory 941, and a network interface 944. In some embodiments, the processor 942 is configured to execute computer readable instructions stored in the memory 941 to perform one or more steps of the methods described herein with reference to FIGS. 1-3. The content sharing server 940 may be connected to or include one or more of an object database 960 and a content item database 950.

The content item database 950 may store information relating to each of the tagged object or object class, content item(s) tagged to each object or object class, and the sharing settings associated with the content item and/or tagged object. In some embodiments, step 350 in FIG. 3 is performed by storing the information into the content item database 950.

The object database 960 may include a database of known objects used by the object recognition algorithm of the system to identify one or more real-world objects and their attributes. In some embodiments, image(s) of the real-world object is compared to one or more images of objects in the object database 960. When there is a match, the object database 960 may provide further information relating to the object, such as object name, object type, object model, etc.

In some embodiments, one or more of the object database 960 and the content item database 950 may be part of the content sharing server 940. In some embodiments, the object database 960 and the content item database 950 may be implemented as a single database. In some embodiments, the content sharing server 940 communicates with one or more of the object database 960 and the content item database 950 also via the network 905. In some embodiments, the object database 960 may be maintained and controlled by a third party. In some embodiments, the object database 960 may "learn" new objects by receiving user provided images and attributes, and adding the user provided information to its database. For example, when a user takes a picture of a car and enters its make and model, the object database may subsequently be able to recognize another image of the same car and be able to provide information on its make and model. While only one content sharing server 940 is shown, it is understood that the content sharing server 940, the object database 960, and content item database 950 may be implemented with one or more physical devices connected through a network.

The social networking server 970 provides social networking functions for users to connect to each other and build social networks and group. The social networking server 970 may be part of the content sharing server 940 or a third party service. The connections and groups built in the social networking service may be used to configure the sharing setting discussed herein. For example, if a content item is configured to be shared only with "friends" of the author, the content sharing server 940 may query the social networking server 970 for the social networking status between two users to determine whether a content item should be provided to a second user. In some embodiments, when a user is configuring sharing settings, information can be retrieved from the social networking server 979 such that the user can select among his/her friends and/or social groups to share the content item.

In some embodiments, one or more of the embodiments, methods, approaches, and/or techniques described above may be implemented in one or more computer programs or software applications executable by a processor based apparatus or system. By way of example, such processor based system may comprise the processor based apparatus or system 900, or a computer, entertainment system, game console, graphics workstation, server, client, portable device, pad-like device, etc. Such computer program(s) may be used for executing various steps and/or features of the above-described methods and/or techniques. That is, the computer program(s) may be adapted to cause or configure a processor based apparatus or system to execute and achieve the functions described above. For example, such computer program(s) may be used for implementing any embodiment of the above-described methods, steps, techniques, or features. As another example, such computer program(s) may be used for implementing any type of tool or similar utility that uses any one or more of the above described embodiments, methods, approaches, and/or techniques. In some embodiments, program code macros, modules, loops, subroutines, calls, etc., within or without the computer program(s) may be used for executing various steps and/or features of the above-described methods and/or techniques. In some embodiments, the computer program(s) may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more non-transitory computer readable storage mediums storing one or more computer programs adapted to cause a processor based apparatus or system to execute steps comprising: identifying one or more objects in one or more images of real-world scenes associated with a user; adding the identified one or more objects to a list of real-world objects associated with the user; assigning each object in the list of real-world objects to an object class based on image recognition; and providing a notification to the user that a content item has been associated with an object class assigned to one of the objects on the list of real-world objects associated with the user. In another example, in some embodiments the present invention provides one or more non-transitory computer readable storage mediums storing one or more computer programs adapted to cause a processor based apparatus or system to execute steps comprising: identifying one or more objects in one or more images associated with a first user, wherein the identifying is performed by an image recognition technique run by a processor based apparatus; for each identified object, searching through one or more images associated with other users to identify one or more images of interest, wherein the one or more images of interest each depict an object that (i) has an appearance substantially matching the identified object and (ii) has been designated by one of the other users for inclusion in the searching; generating a notification that is based at least in part on any identified images of interest; and providing the notification to the first user. In yet another example, in some embodiments the present invention provides one or more non-transitory computer readable storage mediums storing one or more computer programs adapted to cause a processor based apparatus or system to execute steps comprising: identifying one or more objects in one or more images of real-world scenes associated with a first user; adding the identified one or more objects to a list of real-world objects associated with the first user; assigning each object in the list of real-world objects to an object class based on image recognition; receiving a content item from the first user for a real-world object in the list of real-world objects; and storing the content item and an object class of the real-world object on a server such that the content item is retrievable by a second user viewing an object in the object class of the real-world object.

While the invention herein disclosed has been described by means of specific embodiments and applications thereof, numerous modifications and variations could be made thereto by those skilled in the art without departing from the scope of the invention set forth in the claims.

What is claimed is:

1. A method comprising:

identifying one or more objects in one or more images associated with a first user, wherein the identifying is performed by an object recognition technique run by a processor based apparatus;

for each identified object, searching through one or more images associated with other users to identify one or more images of interest, wherein the one or more images of interest each depict an object that (i) has an appearance substantially matching the identified object and (ii) has been designated by one of the other users for inclusion in the searching;

wherein for at least one of the one or more images of interest, the one of the other users has also provided and associated a content item with the object that has an appearance substantially matching the identified object; and providing a notification to the first user that the content item provided by the one of the other users has been associated with the object that has an appearance substantially matching the identified object;

wherein the providing the notification to the first user is based at least in part on a setting that is configured by the one of the other users, wherein the setting defines whether or not the object that has an appearance substantially matching the identified object must actually comprise the actual identified object in order for the notification to be provided to the first user.

2. The method of claim 1, wherein the notification comprises a list of any identified images of interest.

3. The method of claim 1, wherein the notification comprises an indication of whether any content items have been associated with any objects having an appearance substantially matching any identified objects.

4. The method of claim 1, wherein at least one of the one or more images associated with the first user is included in one or more videos associated with the first user.

5. The method of claim 1, wherein the identifying one or more objects in the one or more images associated with the first user identifies only one or more inanimate objects in one or more images associated with the first user.

6. A method comprising:
identifying one or more objects in one or more images of real-world scenes associated with a first user;
adding the identified one or more objects to a list of real-world objects associated with the first user;
assigning each object in the list of real-world objects to an object class based on object recognition;
receiving a content item from the first user for a real-world object in the list of real-world objects;
storing the content item and an object class of the real-world object on a server such that the content item is retrievable by a second user viewing an object in the object class of the real-world object; and
receiving a sharing setting from the first user for the real-world object, wherein the sharing setting comprises information used in subsequent comparisons of the real-world object to objects depicted in images associated with other users to define whether the real-world object will be matched only with an image of the actual real-world object or with an image of any object sharing one or more common attributes with the real-world object.

7. The method of claim 6, wherein the assigning of the corresponding real-world object to a object class is at least partially based on the sharing setting.

8. The method of claim 6, wherein the content item comprises one or more of a text comment, an image, an audio clip, and a video clip.

9. The method of claim 6, wherein the one or more images of real-world scenes comprise images in a photo album captured at a plurality of locations and over a plurality of time periods.

10. The method of claim 6, wherein each object class corresponds to one or more of a unique object, a group of visually similar objects, and a group of objects sharing one or more common attributes.

11. The method of claim 6, wherein object recognition comprises comparing features of one or more images of the object to features of a plurality of known objects.

12. An apparatus comprising:
a processor-based device; and
a non-transitory storage medium storing a set of computer readable instructions configured to cause the processor-based device to perform steps comprising:
identifying one or more objects in one or more images of real-world scenes associated with a first user;
adding the identified one or more objects to a list of real-world objects associated with the first user;
assigning each object in the list of real-world objects to an object class based on object recognition;
receiving a content item from the first user for a real-world object in the list of real-world objects;
storing the content item and an object class of the real-world object on a server such that the content item is retrievable by a second user viewing an object in the object class of the real-world object; and
receiving a sharing setting from the first user for the real-world object, wherein the sharing setting comprises information used in subsequent comparisons of the real-world object to objects depicted in images associated with other users to define whether the real-world object will be matched only with an image of the actual real-world object or with an image of any object sharing one or more common attributes with the real-world object.

* * * * *